US012561065B2

(12) United States Patent
Kamran et al.

(10) Patent No.: US 12,561,065 B2
(45) Date of Patent: Feb. 24, 2026

(54) PROVIDING ENDURANCE TO SOLID STATE DEVICE STORAGE VIA QUERYING AND GARBAGE COLLECTION

(71) Applicant: Dell Products L.P., Round Rock, TX (US)

(72) Inventors: Lior Kamran, Richon LeZion (IL); Amitai Alkalay, Kadima (IL); Steven A. Morley, Mendon, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/736,861

(22) Filed: Jun. 7, 2024

(65) Prior Publication Data

US 2025/0377804 A1     Dec. 11, 2025

(51) Int. Cl.
G06F 3/06 (2006.01)

(52) U.S. Cl.
CPC .......... G06F 3/0616 (2013.01); G06F 3/0659 (2013.01); G06F 3/0679 (2013.01)

(58) Field of Classification Search
CPC ..... G06F 3/0616; G06F 3/0659; G06F 3/0679
See application file for complete search history.

(56) References Cited

U.S. PATENT DOCUMENTS

| | | | |
|---|---|---|---|
| 10,922,234 B2 | 2/2021 | Li | |
| 11,042,307 B1 | 6/2021 | Li | |
| 11,126,561 B2 | 9/2021 | Li | |
| 2018/0373428 A1 | 12/2018 | Kan et al. | |
| 2021/0374056 A1 | 12/2021 | Malladi et al. | |
| 2022/0121563 A1 | 4/2022 | Kamran et al. | |
| 2023/0236762 A1* | 7/2023 | Vaghasiya ............. | G06F 3/0659 711/154 |
| 2024/0134799 A1 | 4/2024 | Shatsky et al. | |
| 2024/0354015 A1 | 10/2024 | Shatsky et al. | |

* cited by examiner

*Primary Examiner* — Larry T MacKall
(74) *Attorney, Agent, or Firm* — BainwoodHuang

(57) ABSTRACT

A technique provides endurance to solid state device (SSD) storage. Such a technique involves querying the SSD storage for locations which are about to be refreshed by the SSD storage. Such a technique further involves identifying storage objects that include the locations which are about to be refreshed in response to querying the SSD storage. Such a technique further involves, prior to the locations which are about to be refreshed being refreshed by the SSD storage, garbage collecting at least some of the identified storage objects to increase endurance of the SSD storage.

20 Claims, 7 Drawing Sheets

700

Query SSD storage for locations which are about to be refreshed by the SSD storage ~702

Identify storage objects that include the locations which are about to be refreshed in response to querying the SSD storage ~704

Prior to the locations which are about to be refreshed being refreshed by the SSD storage, garbage collect at least some of the identified storage objects ~706

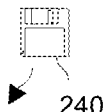

240

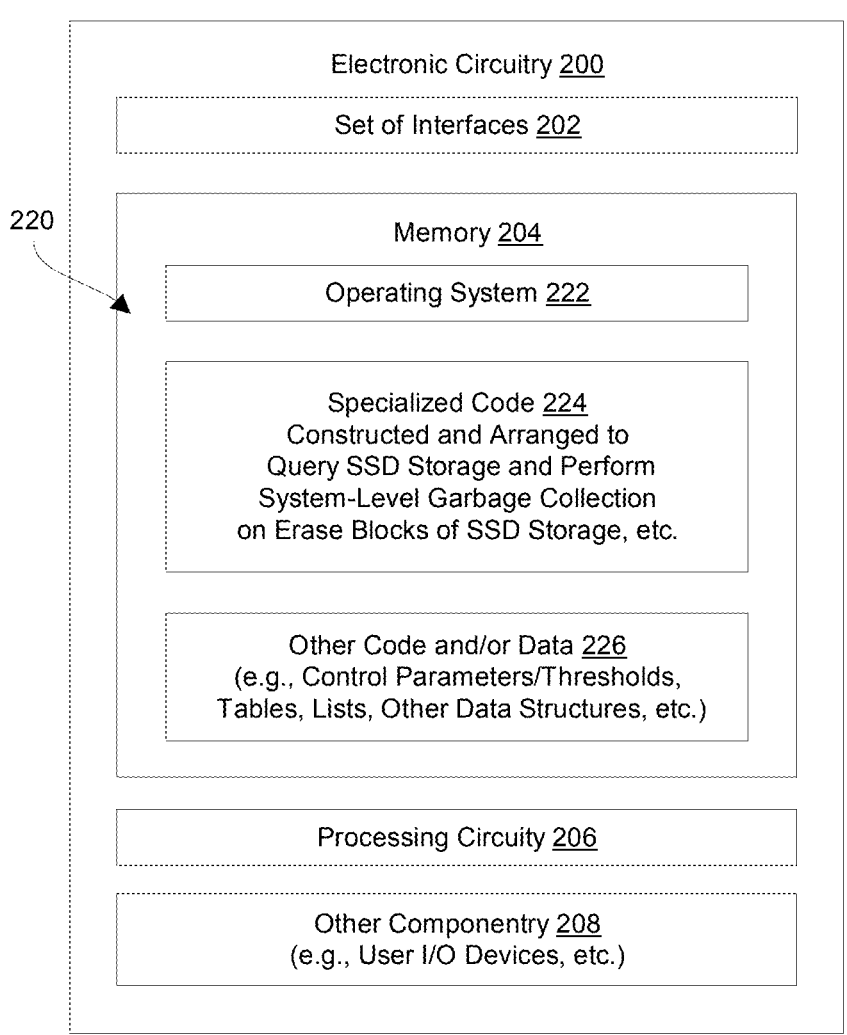

Electronic Circuitry 200

Set of Interfaces 202

220

Memory 204

Operating System 222

Specialized Code 224
Constructed and Arranged to
Query SSD Storage and Perform
System-Level Garbage Collection
on Erase Blocks of SSD Storage, etc.

Other Code and/or Data 226
(e.g., Control Parameters/Thresholds,
Tables, Lists, Other Data Structures, etc.)

Processing Circuity 206

Other Componentry 208
(e.g., User I/O Devices, etc.)

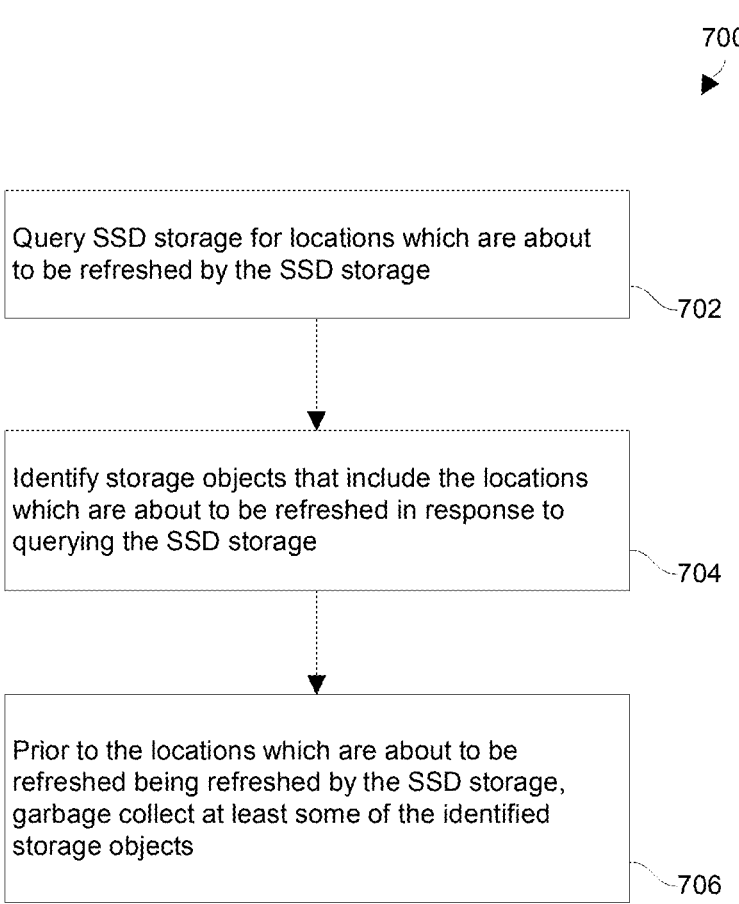

Query SSD storage for locations which are about to be refreshed by the SSD storage

702

Identify storage objects that include the locations which are about to be refreshed in response to querying the SSD storage

704

Prior to the locations which are about to be refreshed being refreshed by the SSD storage, garbage collect at least some of the identified storage objects

PROVIDING ENDURANCE TO SOLID STATE DEVICE STORAGE VIA QUERYING AND GARBAGE COLLECTION

BACKGROUND

A conventional data storage system includes storage processors and storage drives. The storage processors perform input/output (I/O) operations to store data within the storage drives and read data from the storage drives on behalf of one or more host computers.

Quad-level cell (QLC) solid state devices (SSDs) are commonly used as data storage system storage drives. Such QLC SSDs offer greater capacity and tend to be less expensive (e.g., lower cost per gigabyte) compared to other types of storage drives such as triple-level cell (TLC) SSDs.

SUMMARY

It should be understood that there are deficiencies to a conventional data storage system which uses QLC SSDs. Along these lines, QLC SSDs tend to have relatively poor durability. For example, QLC SSDs typically have a lower program/erase (P/E) cycle limit compared to TLC SSDs. Additionally, QLC SSDs require frequent internal refreshes in which data is internally read from one erase block and written to another erase block at refresh intervals in order to prevent data loss due to weakened cell charge. Unfortunately, such internal refreshes consume P/E cycles thus shortening the useful life of QLC SSDs even further.

Improved techniques involve querying SSD storage for locations which are about to be refreshed (e.g., logical block addresses (LBAs) mapped to erase blocks which are about to be refreshed) and then system-level garbage collecting data from these locations just before the SSD storage attempts to refresh these locations. Such system-level garbage collecting of data from these locations alleviates the need to refresh these locations thus improving SSD storage endurance. Additionally, such system-level garbage collection improves storage efficiency and makes the locations available for future use. Even if erase blocks are not fully emptied such that periodic refresh is not entirely avoided, such system-level garbage collection from locations which are about to be refreshed results in less valid data to refresh thus reducing write amplification (WA).

One embodiment is directed to a method of providing endurance to SSD storage. The method includes querying the SSD storage for locations which are about to be refreshed by the SSD storage. The method further includes identifying storage objects that include the locations which are about to be refreshed in response to querying the SSD storage. The method further includes, prior to the locations which are about to be refreshed being refreshed by the SSD storage, garbage collecting at least some of the identified storage objects to increase endurance of the SSD storage.

Another embodiment is directed to data storage equipment which includes memory, and control circuitry coupled to the memory. The memory stores instructions which, when carried out by the control circuitry, cause the control circuitry to perform a method of:

(A) querying SSD storage for locations which are about to be refreshed by the SSD storage;

(B) identifying storage objects that include the locations which are about to be refreshed in response to querying the SSD storage; and (C) prior to the locations which are about to be refreshed being refreshed by the SSD storage, garbage collecting at least some of the identified storage objects to increase endurance of the SSD storage.

Yet another embodiment is directed to a computer program product having a non-transitory computer readable medium which stores a set of instructions to provide endurance to SSD storage. The set of instructions, when carried out by computerized circuitry, causes the computerized circuitry to perform a method of:

(A) querying the SSD storage for locations which are about to be refreshed by the SSD storage;

(B) identifying storage objects that include the locations which are about to be refreshed in response to querying the SSD storage; and (C) prior to the locations which are about to be refreshed being refreshed by the SSD storage, garbage collecting at least some of the identified storage objects to increase endurance of the SSD storage.

In some arrangements, querying the SSD storage includes:

(i) sending a query command to a SSD which forms at least some of the SSD storage, and (ii) receiving a set of addresses from the SSD in response to sending the query command.

In some arrangements, sending the query command to the SSD includes providing, as part of the query command, a time parameter identifying an amount of time.

In some arrangements, receiving the set of addresses from the SSD includes acquiring, as the set of addresses from the SSD, a set of LBAs which the SSD maps to a set of physical blocks that are scheduled to be refreshed (e.g., via SSD internal garbage collection which is different from system-level garbage collection) within the amount of time identified by the time parameter.

In some arrangements, the SSD storage includes SSDs. Additionally, the storage objects are physical large blocks (PLBs) formed by segments of the SSDs. Furthermore, a table descriptor table includes PLB descriptors corresponding to the PLBs formed by the segments of the SSDs. Also, identifying the storage objects includes:

(i) translating the locations which are about to be refreshed to PLBs which include the locations which are about to be refreshed, and (ii) updating particular PLB descriptors of the PLB descriptor table with upcoming refresh times in response to querying the SSD storage, the particular PLB descriptors corresponding to the PLBs which include the locations which are about to be refreshed.

In some arrangements, identifying the storage objects further includes, after the particular PLB descriptors of the PLB descriptor table are updated, computing refresh scores for the PLB descriptors of the PLB descriptor table based on the upcoming refresh times.

In some arrangements, identifying the storage objects further includes, after the refresh scores for the PLB descriptors of the PLB descriptor table are computed, queuing a set of PLBs for garbage collection based on the refresh scores for the PLB descriptors.

In some arrangements, the SSD storage includes SSDs. Additionally, the storage objects are PLBs formed by segments of the SSDs. Furthermore, garbage collecting at least some of the identified storage objects includes performing system-level garbage collection on PLBs which include the locations which are about to be refreshed.

In some arrangements, the SSDs include mapped segments which are scheduled to be refreshed and unmapped segments where are not scheduled to be refreshed. Additionally, performing system-level garbage collection on the PLBs includes:

(i) reading data from at least some of the mapped segments which are scheduled to be refreshed, and (ii) writing the data to at least some of the unmapped segments which are not scheduled to be refreshed.

In some arrangements, reading the data from at least some of the mapped segments which are scheduled to be refreshed includes reading the data from a first number of SSD locations. Additionally, writing the data to at least some of the unmapped segments which are not scheduled to be refreshed includes writing the data to a second number of SSD locations, the second number being less than the first number.

In some arrangements, the SSDs include mapped segments which are scheduled to be refreshed (e.g., via SSD internal garbage collection). Additionally, performing system-level garbage collection on the PLBs includes reading data from at least some of the mapped segments which are scheduled to be refreshed. The at least some of the mapped segments are scheduled to be refreshed at an upcoming refresh time. Additionally, the data is read from the at least some of the mapped segments prior to the upcoming refresh time.

In some arrangements, the method further includes, prior to the upcoming refresh time, sending unmap commands to the SSDs to prevent the at least some of the mapped segments from being refreshed (e.g., via the SSD internal garbage collection) at the upcoming refresh time.

In some arrangements, garbage collecting at least some of the identified storage objects includes, based on refresh time information obtaining in response to querying the SSD storage, generating refresh scores that correspond to the identified storage objects.

In some arrangements, a system-level garbage collection service is constructed and arranged to perform system-level garbage collection on storage objects based on storage object identifiers residing in a set of queues. Additionally, the system-level garbage collection service is currently in an active state. Furthermore, garbage collecting at least some of the identified storage objects further includes, in response to particular refresh scores corresponding to particular storage objects being lower than a predefined refresh score threshold, placing storage object identifiers corresponding to the particular storage objects in the set of queues to direct the system-level garbage collection service to garbage collect the particular storage objects based on the storage object identifiers placed in the set of queues.

In some arrangements, a system-level garbage collection service is constructed and arranged to perform system-level garbage collection on storage objects based on storage object identifiers residing in a set of queues. Additionally, the system-level garbage collection service is currently in an idle state. Furthermore, garbage collecting at least some of the identified storage objects further includes, in response to particular refresh scores corresponding to particular storage objects being lower than a predefined refresh score threshold, placing storage object identifiers corresponding to the particular storage objects in the set of queues and transitioning the system-level garbage collection service from the idle state to an active state to direct the system-level garbage collection service to garbage collect the particular storage objects based on the storage object identifiers placed in the set of queues.

It should be understood that, in the cloud context, at least some electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in providing endurance to SSD storage via querying and garbage collection.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 2 is a block diagram of electronic circuitry of the data storage environment of FIG. 1 in accordance with certain embodiments.

FIG. 7 is a flowchart of a procedure which provides endurance to SSD storage in accordance with certain embodiments.

DETAILED DESCRIPTION

Overview

An improved technique is directed to querying solid state device (SSD) storage for locations which are about to be refreshed (e.g., logical block addresses or LBAs which are mapped to erase blocks that are about to be refreshed) and then system-level garbage collecting data from these locations just before the SSD storage attempts to refresh these locations. Such system-level garbage collecting of data from these locations alleviates the need to refresh these locations thus improving SSD storage endurance. Furthermore, such system-level garbage collection improves storage efficiency and makes the locations available for future use. Even if the locations are not fully emptied such that periodic refresh is not entirely avoided, such system-level garbage collection from locations about to be refreshed results in less valid data to refresh thus reducing write amplification (WA).

Figure 1:
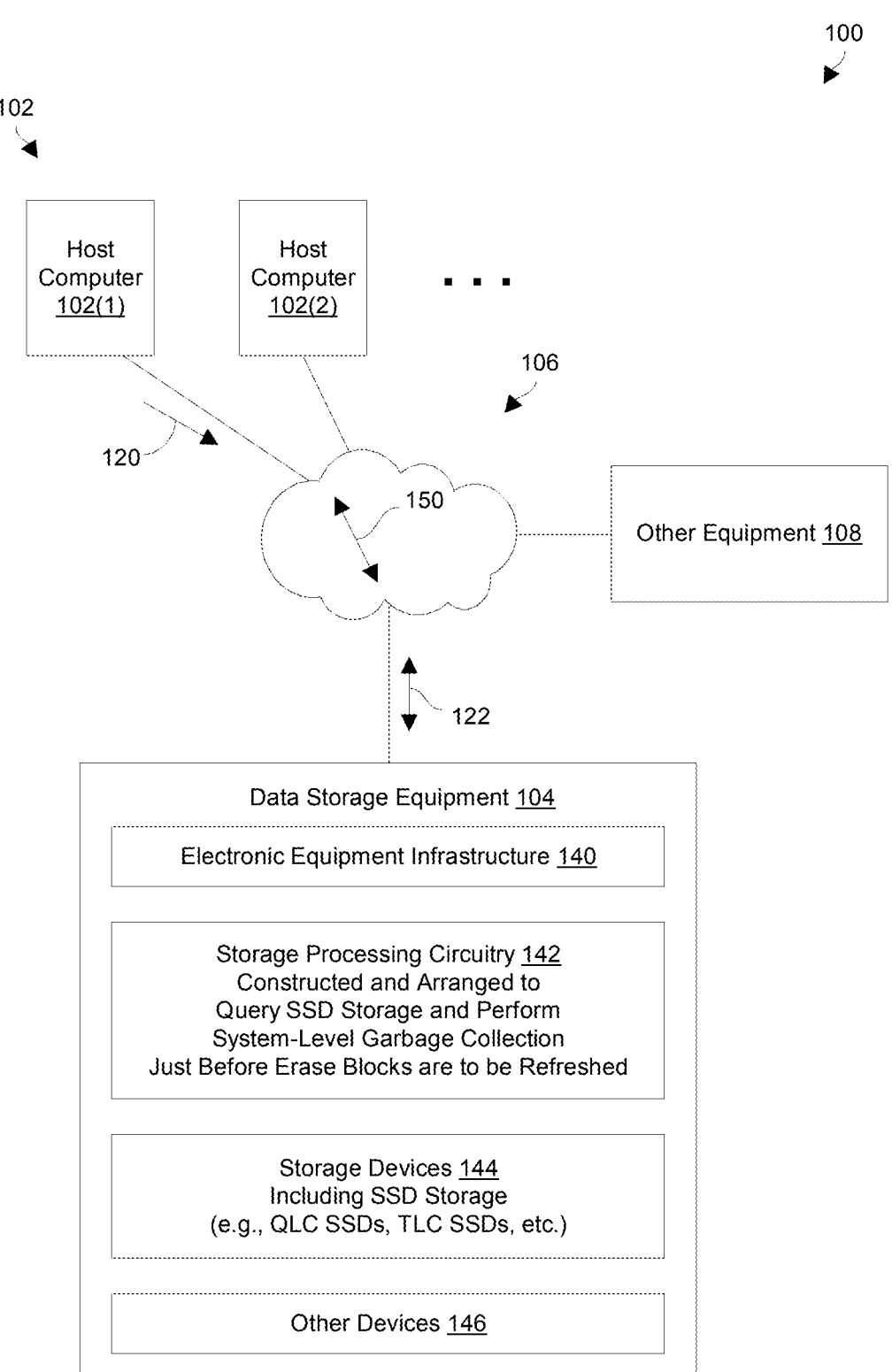
FIG. 1 is a block diagram of a data storage environment which provides endurance to solid state device (SSD) storage in accordance with certain embodiments.

FIG. 1 shows a data storage environment 100 which provides endurance to SSD storage via querying and garbage collection in accordance with certain embodiments. The data storage environment 100 includes host computers 102(1), 102(2), (collectively, host computers 102), data storage equipment 104, a communications medium 106, and perhaps other equipment 108.

Each host computer 102 is constructed and arranged to perform useful work. For example, one or more of the host computers 102 may operate as a file server, a web server, an email server, an enterprise server, a database server, a transaction server, combinations thereof, etc. which provides input/output (I/O) requests 120 to the data storage equipment 104. In this context, the host computers 102 may provide a variety of different I/O requests 120 (e.g., block and/or file based write commands, block and/or file based read commands, combinations thereof, etc.) that direct the data storage equipment 104 to store host data 122 within and/or retrieve host data 122 from storage (e.g., primary storage or main memory, secondary storage, tiered storage, combinations thereof, etc.).

The data storage equipment 104 is an example of electronic equipment that is capable of providing endurance to SSD storage via querying and garbage collection. The data storage equipment 104 includes an electronic equipment infrastructure 140, storage processing circuitry 142, storage devices 144 including SSD storage, and other devices 146. Other types of electronic equipment may include one or more of these components and, in accordance with certain embodiments, one or more of the improvements disclosed herein is applied to such other types of electronic equipment (e.g., general purpose computing equipment, database equipment, computational equipment, network equipment, specialize equipment, combinations thereof, etc.).

The electronic equipment infrastructure 140 is constructed and arranged to support operation of various components of the data storage equipment 104. To this end, the electronic equipment infrastructure 140 positions the various components relative to each other, conveys power signals from power converters to the various components, positions fans along air pathways to provide cooling to the various components (i.e., to remove heat), protects the various components against tampering, damage, and so on. Along these lines, the electronic equipment infrastructure 140 may include one or more frames or card cages, chassis/housings/cabinets, power supplies/converters, fans, backplanes or midplanes, and so on.

The storage processing circuitry 142 is constructed and arranged to respond to the I/O requests 120 received from the host computers 102 by writing data into the set of storage devices 144 and/or reading the data from the storage devices 144. The storage processing circuitry 142 may include one or more physical storage processing modules or engines, data movers, director boards, blades, etc. In accordance with certain embodiments, the storage processing circuitry 142 may include a variety of specialized subcomponents such as processing circuitry to process the I/O requests 120 from the host computers 102, cache memory to operate as read and/or write caches, on-board NICs to provide communications between the storage processing circuitry 142 and/or external devices, LEDs, switches for local I/O, and so on.

The storage devices 144 are constructed and arranged to store data within the data storage equipment 104. In accordance with certain embodiments, the storage devices 144 may arrange the data in accordance with one or more data protection schemes (e.g., RAID1, RAID5, RAID6, RAID10, etc.). Example storage devices 144 include RAM devices, NVRAM devices, other solid state memory devices (SSDs), hard disk drives (HDDs), combinations thereof, and so on. As will be explained in further detail shortly, at least some of the storage devices 144 are SSDs which perform periodic refreshes, and the storage processing circuitry 142 improves the endurance of these SSDs via querying and system-level garbage collection.

In accordance with certain embodiments, the storage processing circuitry 142 organizes storage space from the storage devices 144 into storage extents called "UBERs." The UBERs include drive sections (or "drive slices") from multiple storage devices 144 according to a particular RAID scheme (e.g., RAID5, RAID6, etc.).

As just mentioned, at least some of the storage devices 144 are SSDs which perform periodic refreshes. Example SSDs include multi-level cell (MLC) SSDs such as quad-level cell (QLC) SSDs, triple-level cell (TLC) SSDs, combinations thereof, and so on. Such SSDs require periodic refreshes in which data is internally read from one erase block and written to another erase block at refresh intervals in order to prevent data loss due to weakened cell charge.

In accordance with certain embodiments, the SSDs provide drive slices from which the UBERs are constructed. Such UBERs organize the drive slices into log-structured storage in accordance with a storage protection scheme such as RAID5 or RAID6 (e.g., a RAID group or tier of SSDs). As such, the storage processing circuitry 142 provides an external system-level garbage collection service which is constructed and arranged to, in some situations, clean locations within the SSDs (e.g., relocate valid data from the locations) just prior to the SSDs performing internal refreshes (e.g., with the locations being identified earlier via querying the SSDs). Such operation reduces (or alleviates the need for) internal refreshes and internal garbage collection performed by the SSDs and, therefore, minimizes write amplification and extends the usefulness of the SSDs.

The other devices 146 of the data storage equipment 104 are constructed and arranged to provide supporting features. Along these lines, the other devices 146 may include a set of communications interfaces (e.g., a set of discrete network interface controllers or NICs) that provide communications for the data storage equipment 104, a user interface for local user access, backup power sources, and so on.

The communications medium 106 is constructed and arranged to connect the various components of the data storage environment 100 together to enable these components to exchange electronic signals 150 (e.g., see the double arrow 150). At least a portion of the communications medium 106 is illustrated as a cloud to indicate that the communications medium 106 is capable of having a variety of different topologies including backbone, hub-and-spoke, loop, irregular, combinations thereof, and so on. Along these lines, the communications medium 106 may include copper-based data communications devices and cabling, fiber optic devices and cabling, wireless devices, combinations thereof, etc. Furthermore, the communications medium 106 is capable of supporting LAN-based communications, SAN-based communications, cellular communications, WAN-based communications, distributed infrastructure communications, other topologies, combinations thereof, etc.

The other equipment 108 represents other possible componentry of the data storage environment 100. Along these lines, the other equipment 108 may include remote data storage equipment that provides data to and/or receives data from the data storage equipment 104 (e.g., replication arrays, backup and/or archiving equipment, external service processors and/or other management/control devices, etc.).

During operation, the data storage equipment 104 processes I/O requests 120 from the set of host computers 102 to perform useful work. In particular, the storage processing circuitry 142 writes host data 122 into and retrieves host data 122 from the storage devices 144 in response to the I/O requests 120.

During such operation, the storage processing circuitry 142 performs log structured writes on the SSD storage. Additionally, the storage processing circuitry 142 performs system-level garbage collection to reclaim unused storage space within the SSD storage (e.g., by consolidating valid data into fewer erase blocks to free up erase blocks for future use).

It should be appreciated that, during such operation, the SSD storage may perform internal operations to manage data as well. Along these lines, the SSD storage may perform internal garbage collection, erase block periodic refreshes at a periodic refresh interval, and so on. In some arrangements, the SSD storage performs internal garbage collection and periodic refreshes together (i.e., simultaneously as an advanced operation).

Unfortunately, if left unmanaged or if improperly managed, these internal operations may unnecessarily reduce the lifetime of the SSD storage (e.g., due to periodic refreshes, due to write amplification, combinations thereof, etc.). However, as will be explained in further detail below, the storage processing circuitry 142 may pre-empt internal periodic refreshes of the erase blocks by, at the system level, garbage collecting data from the erase blocks prior to upcoming periodic refresh operations. Such activity alleviates the need to perform the periodic refresh operation and thus extends the lifetime of the SSD storage.

Along these lines, as will be explained in further detail shortly and in accordance with certain embodiments, the SSD storage may be formed from special SSDs that are constructed and arranged to receive and respond to query commands which request identification of logical block addresses (LBAs) mapped to erase blocks which are about to be refreshed. In accordance with certain embodiments, such query commands include time interval parameters which identify amounts of time (e.g., 30 minutes), and the special SSDs are constructed and arranged to respond to such query commands (e.g., from the storage processing circuitry 142) with lists of LBAs that are scheduled to be refreshed within the amounts of time identified by the time interval parameters (e.g., within the next 30 minutes). In other embodiments, the SSDs support different commands for different amounts of time (e.g., a first command to return LBAs that will be refreshed in A minutes, a second command to return LBAs that will be refreshed in B minutes, a third command to return LBAs that will be refreshed in C minutes, etc.), and the SSDs provide lists of LBAs depending on the commands.

Once the LBAs are identified, the storage processing circuitry 142 performs system-level garbage collection on the SSD storage prior to the erase blocks being refreshed. Along these lines, such system-level garbage collection may target storage objects (e.g., physical large blocks or PLBs) formed by the identified LBAs. Once such system-level garbage collection is performed, the storage processing circuitry 142 directs the SSDs to unmap the LBAs from the cleaned erase blocks to indicate that the data at those LBAs is no longer valid thus alleviating the need to refresh and saving P/E cycles. Even if the erase blocks are not fully emptied such that periodic refresh is not entirely avoided, such system-level garbage collection results in less valid data to refresh thus reducing write amplification (WA).

In some arrangements, the storage processing circuitry 142 is constructed and arranged to manage data among the storage devices 144 using PLB granularity. Further details will now be provided with reference to FIG. 2.

FIG. 2 is a block diagram of electronic circuitry 200 which is suitable for at least a portion of the data storage equipment 104 in accordance with certain embodiments (also see the storage processing circuitry 142 in FIG. 1). The electronic circuitry 200 includes a set of interfaces 202, memory 204, processing circuitry 206, and other componentry (or circuitry) 208.

The set of interfaces 202 is constructed and arranged to connect the electronic circuitry 200 to the communications medium 106 (FIG. 1) to enable communications with other devices of the data storage environment 100. Such communications may be IP-based, SAN-based, cellular-based, cable-based, fiber-optic based, wireless, cloud-based, combinations thereof, and so on. Additionally, the set of interfaces 202 is constructed and arranged to connect the electronic circuitry 200 to other local equipment. Accordingly, the set of interfaces 202 may include one or more host interfaces (e.g., a computer network interface, a fibre-channel interface, etc.), one or more storage device interfaces (e.g., a host adapter or HBA, etc.), and other interfaces. As a result, the set of interfaces 202 enables the electronic circuitry 200 to robustly and reliably communicate with various apparatus.

The memory 204 is intended to represent both volatile storage (e.g., DRAM, SRAM, etc.) and non-volatile storage (e.g., solid state memory, magnetic memory, etc.). The memory 204 stores a variety of software constructs 220 including an operating system 222, specialized code 224, and other code and data 226. The operating system 222 refers to particular control code such as a kernel to manage computerized resources (e.g., processor cycles, memory space, etc.), the I/O stack (e.g., drivers), and so on. The specialized code 224 refers to particular instructions and/or other software constructs for, among other things, querying SSD storage and performing system-level garbage collection on erase blocks of SSD storage just before the erase blocks are to be internally refreshed. The other code and data 226 refers to control parameters/thresholds, tables, lists, other data structures, routines, combinations thereof, and so on.

The processing circuitry 206 is constructed and arranged to operate in accordance with the various software constructs 220 stored in the memory 204. Along these lines, the processing circuitry 206 may execute the specialized code 224 to form specialized circuitry that robustly and reliably enables the electronic circuitry 200 to query SSD storage and perform data storage operations as well as provide a system-level garbage collection service. Such processing circuitry 206 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 240 is capable of delivering all or portions of the software constructs 220 to the electronic circuitry 200. In particular, the computer program product 240 has a non-transitory (or non-volatile) computer readable medium which stores a set of instructions that controls one or more operations of the electronic circuitry 200. Examples of suitable computer readable storage media include tangible articles of manufacture and apparatus which store instructions in a non-volatile manner such as DVD, CD-ROM, flash memory, disk memory, tape memory, and the like.

The other componentry 208 refers to other hardware of the electronic circuitry 200. Along these lines, the electronic circuitry 200 may further include specialized equipment such as a local user I/O circuitry, circuitry for fault tolerance, etc. Further details will now be provided with reference to FIGS. 3 through 5.

Storage Object Details

Figure 3:
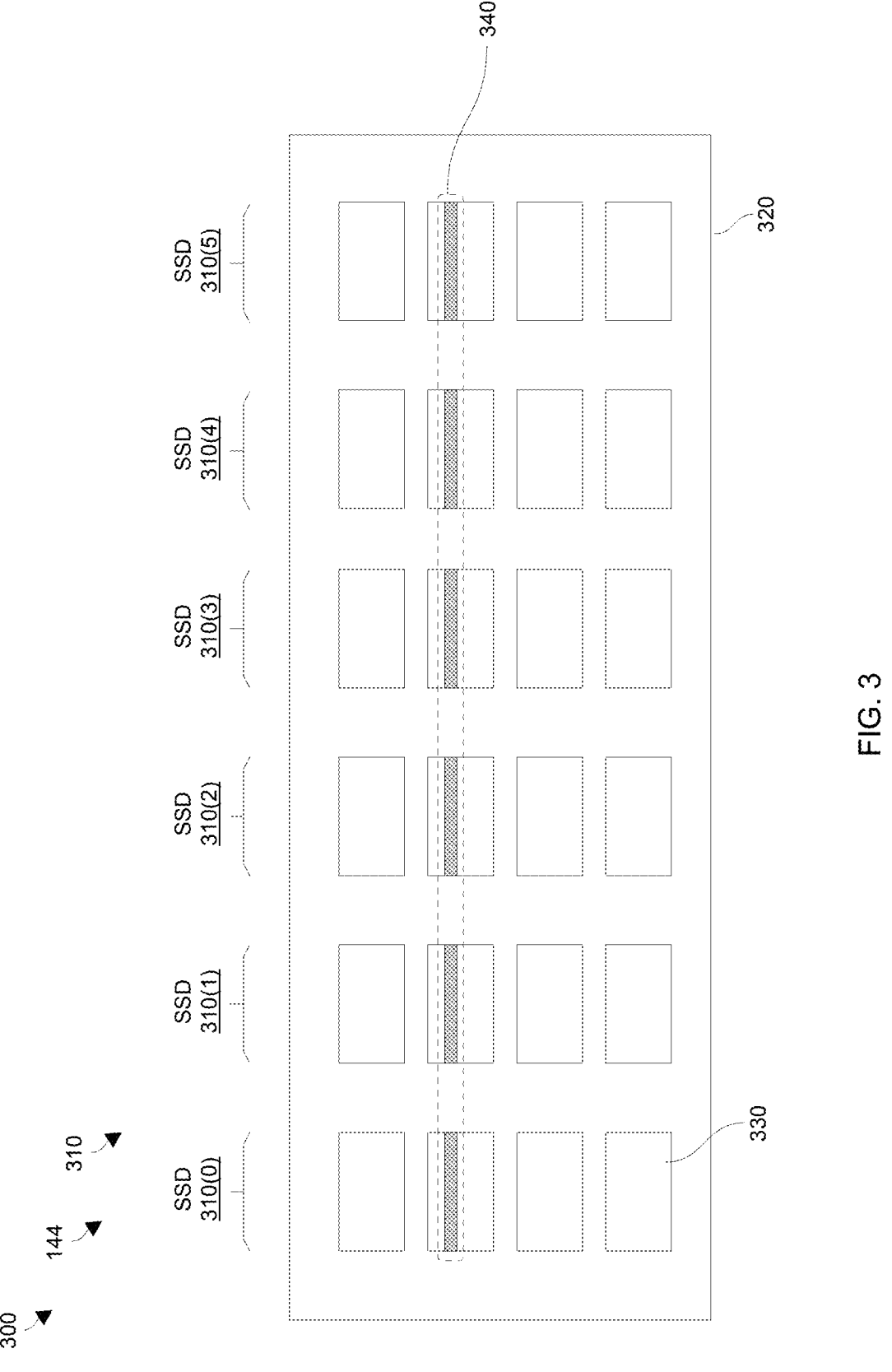
FIG. 3 is a block diagram an example UBER and physical large block (PLB) in accordance with certain embodiments.
Figure 4:
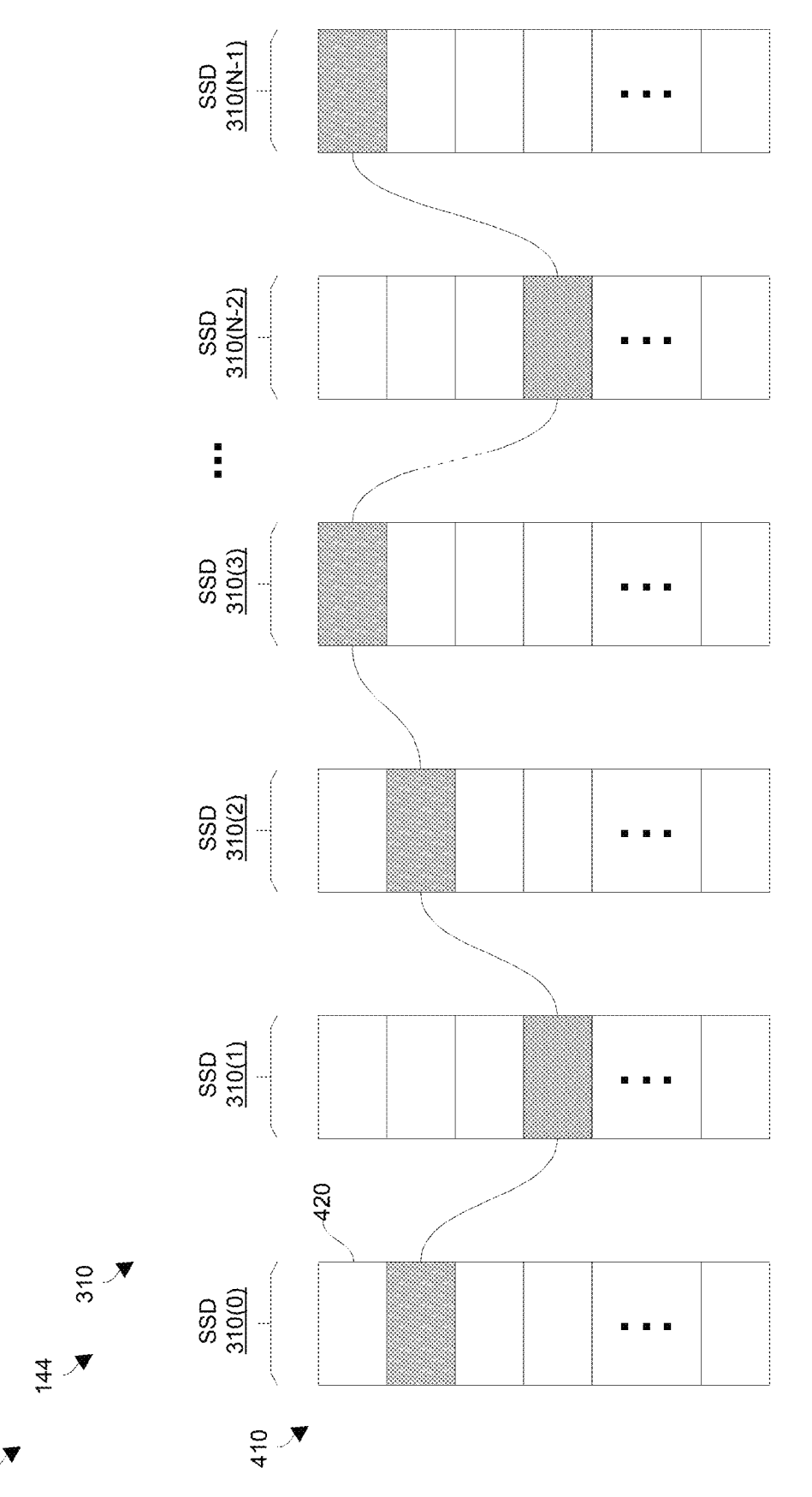
FIG. 4 is a block diagram illustrating how an UBER is constructed in accordance with certain embodiments.

FIGS. 3 and 4 provide certain storage object details in accordance with certain embodiments. FIG. 3 shows a view 300 of an example UBER and an example PLB in accordance with the RAID6 (4+2) data protection scheme. FIG. 4 shows a view 400 illustrating how an UBER with PLBs may be created from slices across multiple storage devices 144.

As mentioned earlier, the storage devices 144 include SSD storage which may be formed by MLC SSDs (also see FIG. 1). FIG. 3 shows SSDs 310 which are suitable for forming at least part of the SSD storage. By way of example only, there are six SSDs 310(0), 310(1), 310(2), 310(3), 310(4), 310(5) although, for other RAID protection schemes, the total number of SSDs 310 that are used may be fewer than six or more than six.

As shown in the view 300 of FIG. 3, the storage processing circuitry 142 may organize storage space from the SSDs 310 into an example UBER 320. It should be appreciated that UBER slices are contiguous ranges of drive LBAs (Logical Block Addresses) within the drives. Internally, the SSDs 310 map the LBAs to erase blocks and such erase blocks may be periodically refreshed by internal SSD circuitry. Additionally or as part of the periodic refresh process, the SSDs 310 may perform internal garbage collection in which valid data from multiple source erase blocks is consolidated and written to a destination erase block thus freeing the source erase blocks for subsequent use.

As shown in FIG. 3, the example UBER 320 has a structure in accordance with the RAID6 (4+2) data protection scheme. Along these lines, the example UBER 320 includes multiple drive slices 330 from the SSDs 310. Additionally, the storage processing circuitry 142 of the data storage equipment 104 (FIG. 1) may be configured to write data into individual lines 340 of storage referred to as PLBs, i.e., the storage processing circuitry 142 may be configured to perform log-structured writes of the UBER 320 with PLB granularity.

By way of example, the UBER 320 includes four drive slices 330 from four SSDs 310 for data, and other four drive slices 330 from two other SSDs 310 for parity to provide RAID6 (4+2) protection. Accordingly, data stored within the UBER 320 will remain available even after two storage device failures.

In a particular use case, each drive slice 330 is 4 GB in size. Accordingly, the UBER 320 provides 64 GB of storage capacity for user data (4 drive slices of 4 GB×4 data drives=4×4×4=64 GB of user data), and the total UBER capacity is 96 GB (including two parity SSDs 310 each providing four drive slices 330).

It should be understood that other RAID protection schemes and/or other structures for an UBER are suitable for use. For example, a similar structure to that shown in FIG. 3 but without the SSD 310(5) is suitable for forming an UBER that provides RAID5 (4+1) protection, and so on.

Similarly, other sizes are suitable for use. In accordance with certain embodiments, each line 340 in the UBER 320 contains 2 MB of compressed regular data. Here, the 2 MB may be distributed across four SSDs 310 (e.g., SSDs 310(0), 310(1), 310(2), and 310(3) in FIG. 3).

Additionally, each line 340 in the UBER 320 may contain parity information. For example, in the context of RAID6 (4+2), parity resides on two SSDs 310 (e.g., SSDs 310(4)

and 310(5)), and each parity drive stores 512 KB of parity (which means each line 340 of storage stores a total of 3 MB).

As shown in the view 400 of FIG. 4, a more general (or second example) UBER 410 is created from at least one drive slice 420 (shaded regions) from each of N SSDs 310 (e.g., SSDs 310(0) through 310(N−1) to safeguard data in accordance with a RAID protection scheme (e.g., RAID5, RAID6, etc.). It should be understood that just one drive slice 420 from each SSD 310 is shown as forming the UBER 410, but that the UBER 410 may be formed by multiple drive slices 420 from each SSD 310.

Moreover, the particular drive slices 420 forming the RAID extent are shown in a staggered (or unaligned) arrangement to illustrate that the drive slices 420 may rely on address mapping thus alleviating the need for address alignment across the SSDs 310. Furthermore, the storage processing circuitry 142 of the data storage equipment 104 (FIG. 1) may be configured to write data into individual lines of storage (e.g., PLBs) of the UBER 410 in a manner similar to that described above for the storage lines 340 in FIG. 3.

Additionally, another UBER 410 of the same size may be created by at least one other drive slice 420 from each of the N SSDs 310, and so on. Accordingly, the storage processing circuitry 142 of the data storage equipment 104 is able to provide rich and reliable storage services using multiple UBERs 410.

In some arrangements, the UBERs 410 are formed using a mapped RAID architecture in which N-wide RAID extents are formed from more than N SSDs 310. For example, a RAID5 (4+1) extent may be formed from five drive extents belonging to five different SSDs 310 from an array (or pool) of 16 SSDs 310.

SSD Querying and System-Level Garbage Collection Details

Figure 5:
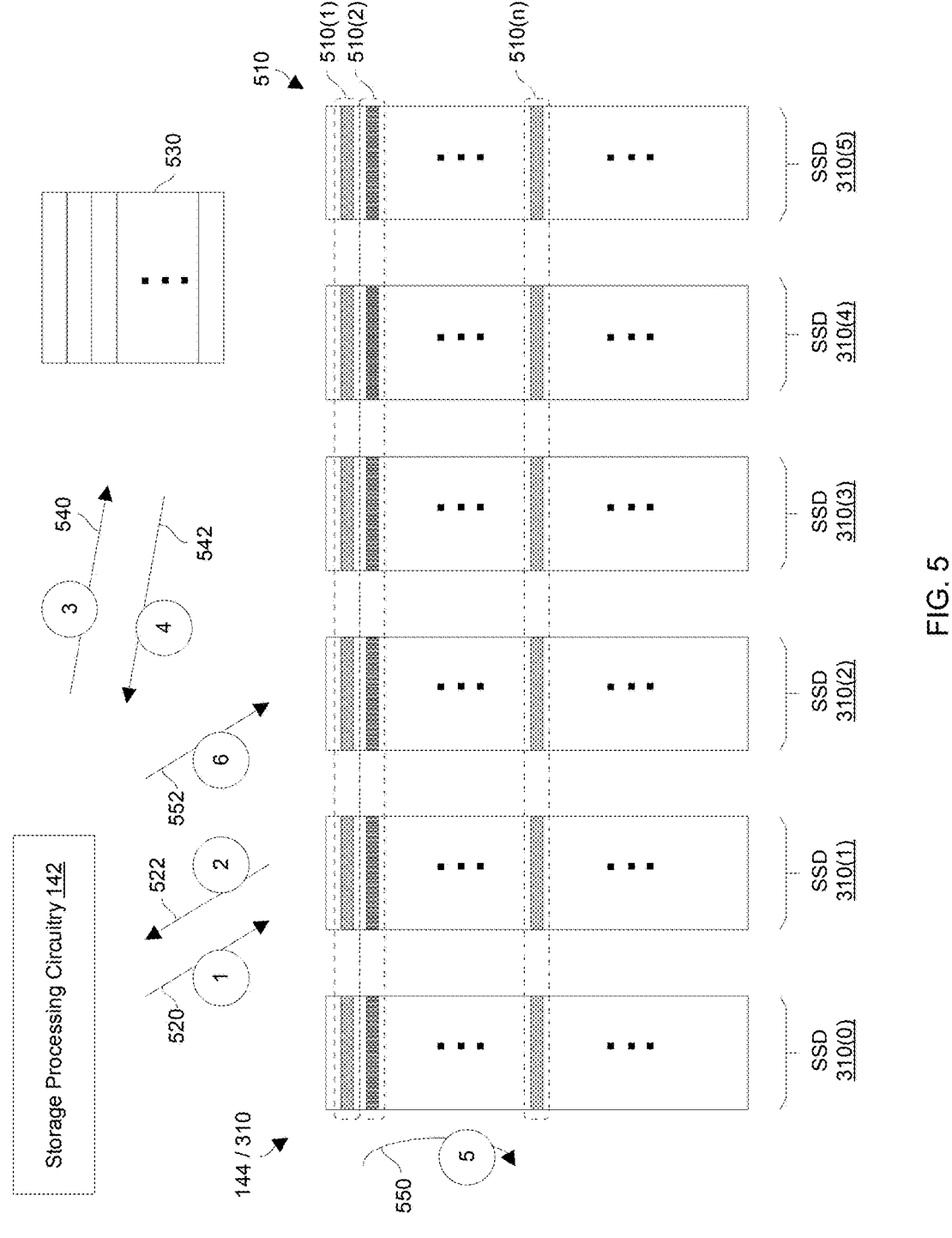
FIG. 5 is a block diagram illustrating certain querying and system-level garbage collecting details in accordance with certain embodiments.

FIG. 5 shows a process 500 which involves querying and performing system-level garbage collection on SSD storage which stores data in certain storage objects (e.g., UBERs and PLBs, also see FIGS. 3 and 4). As mentioned earlier, the storage processing circuitry 142 accesses storage devices 144 which include SSD storage formed from SSDs 310 (also see the data storage equipment 104 in FIG. 1). By way of example and as shown in FIG. 5, such SSD storage includes SSDs 310(0), 310(1), 310(2), 310(3), 310(4), 310(5) which may employ a particular RAID protection scheme such as RAID6 (4+2).

As also mentioned earlier, storage locations provided by the SSDs 310 may be arranged to provide certain storage objects (or structures) such as UBERs 320 having lines of storage (e.g., PLBs) 340 (also see FIG. 3). For example, as shown in FIG. 5, the storage locations provided by the SSDs 310(0), 310(1), 310(2), 310(3), 310(4), 310(5) provides PLBs 510(1), 510(2), . . . 510(n), . . . (collectively, PLBs 510).

To better show how the PLBs 510 are formed, the individual PLB segments (or PLB slices) of the SSDs 310 which form the PLBs 510 are shaded in different textures in FIG. 5. Also, the PLB slices are shown as being aligned for simplification purposes only, and the PLB slices for the PLBs 510 may be unaligned but nevertheless effectively employed due to mapping.

During the process 500, the storage processing circuitry 142 queries the SSD storage to identify which SSD locations are about to be periodically refreshed. Along these lines, suppose that the SSDs 310 support a PRQ (Periodic Refresh Query) command 520. Along these lines, each SSD 310 may be constructed and arranged to recognize a particular opcode (e.g., in hex) for the PRQ command 520 which may further specify a time parameter indicating an amount of time (e.g., 30 minutes) before the SSD 310 is to perform a periodic refresh. The SSD 310 may be further constructed and arranged to return a reply, in response to the PRQ command 520 and the time parameter. Such a reply may include a list of addresses to erase blocks that will be internally refreshed by the SSD 310 within that amount of time (e.g., within the next 30 minutes).

In accordance with certain embodiments, the reply in response to a PRQ command 520 further includes addresses identifying SSD locations and time-to-refresh amounts of time corresponding to the addresses. For example, suppose that a PRQ command 520 sent to a particular SSD 310 includes a time parameter that specifies 30 minutes. The reply from the particular SSD 310 may include a first list (or range) of addresses identifying a first erase block and a first time until the SSD 310 refreshes the first erase block (e.g., five minutes), a second list of addresses identifying a second erase block and a second time until the SSD 310 refreshes the second erase block (e.g., 12 minutes), and so on. Accordingly, the storage processing circuitry 142 is now able to determine which PLBs 510 have PLB slices in the particular SSD 310 which are scheduled to undergo internal refresh within the next 30 minutes.

Along these lines, the SSD 310 may provide, as the list of addresses, ranges of logical block addresses (LBAs) to identify the erase blocks. Such LBAs are used by the storage processing circuitry 142 to identify particular storage locations containing data. In turn, the SSDs 310 internally map the LBAs to particular internal storage locations within the erase blocks (e.g., physical SSD locations).

For example, the storage processing circuitry 142 may send a PRQ command 520 having a time parameter that indicates 30 minutes to the SSD 310(0) (arrow #1 in FIG. 5). Upon receipt, the SSD 310(0) may return a reply 522 to the storage processing circuitry 142. The reply includes a list of LBAs for erase blocks that the SSD 310(0) has scheduled for periodic refreshing in the next 30 minutes (arrow #2 in FIG. 5).

The storage processing circuitry 142 may send other PRQ commands 520 having time parameters (e.g., the same time parameters if the PRQ commands 520 are sent around the same time) to the other SSDs 310, and may receive respective replies 522 from the other SSDs 310 in response to the other PRQ commands (arrows #1 and #2). In this manner, the storage processing circuitry 142 is able to query the SSD storage to identify SSD locations which are about to be periodically refreshed (e.g., which will be refreshed in the next 30 minutes).

Once the storage processing circuitry 142 receives a reply 522 containing a list of addresses (e.g., LBAs) from an SSD 310, the storage processing circuitry 142 updates a PLB descriptor table 530 with this information. Along these lines and as will be explained in further detail shortly, the storage processing circuitry 142 performs a PLB descriptor table update operation 540 to update the PLB descriptor table 530 (arrow #3).

Once the PLB descriptor table 530 has been updated, the storage processing circuitry 142 evaluates whether system-level garbage collection should be performed. Along these lines and as will be explained in further detail shortly, the storage processing circuitry 142 performs an evaluation operation 542 which determines whether there are PLBs 510 that have erase blocks which are close to refresh (arrow #4). In some arrangements, the storage processing circuitry 142 compares upcoming erase block refresh times to a predefined time threshold to identify PLBs 510 for system-level garbage collecting (e.g., if the PLBs 510 have erase blocks which will be refreshed within a few minutes).

If the evaluation operation 542 indicates that there are PLBs 510 for system-level garbage collecting, the storage processing circuitry 142 performs system-level garbage collection 550 (arrow #5). For example, suppose that the predefined time threshold is 10 minutes, and a result of the evaluation operation 542 indicates that the PLBs 510(1), 510(2) are scheduled to be refreshed in 5 minutes. Further suppose that the SSDs 310 are used as log-structured storage and that the PLB 510(n) is free and is the next available PLB 510. In this situation, since the PLBs 510(1), 510(2) will be refreshed in less time than the predefined time threshold, the storage processing circuitry 142 may invoke or schedule (e.g., via queuing) system-level garbage collection to consolidate valid data within the PLBs 510(1), 510(2) and store the consolidated valid data within the PLB 510(n).

As part of the above-described system-level garbage collection or shortly thereafter, the storage processing circuitry 142 updates the SSDs 310 (arrow #6). Along these lines, the storage processing circuitry 142 may send a set of commands 552 to inform the set of SSDs 310 as to which LBAs are no longer used for storing valid data. Commands that are suitable for use include TRIM, UNMAP, and the like.

It should be appreciated that the process 500 improves storage efficiency and makes the locations available for future use. Moreover, such system-level garbage collection alleviates the need for the SSDs 310 to refresh thus improving SSD storage endurance.

It should be understood that the various activities described above may be performed concurrently, separately, at different times, in parallel, etc. For example, a querying service (e.g., a process, a thread, a daemon, etc.) may routinely query the SSDs 310 for SSD locations that are about to be refreshed and update the PLB descriptor table 530 (e.g., arrows #1, #2, and #3). Additionally, a monitoring service may routinely evaluate information in the PLB descriptor table 530 to determine whether there are PLBs 510 that have erase blocks which are close to refresh (arrow #4). Furthermore, a system-level garbage collection service may routinely perform garbage collection and unmapping based on the results of the other services (arrows #5 and #6).

Moreover, such activities may be combined. For example, a service may perform all of the activities associated with arrows #1 through #4.

Moreover, system-level garbage collection may be performed differently based on the current state of the data storage equipment 104 (also see FIG. 1). For example, PLBs 510 which have PLB slices that are about to be internally refreshed by certain SSDs 310 may be system-level garbage collected immediately (e.g., via triggering system-level garbage collection if system-level garbage collection is not currently running) when the data storage equipment 104 is idle or only lightly loaded. However, if the data storage equipment is currently handling a normal load, the PLBs 510 which have PLB slices that are about to be internally refreshed by certain SSDs 310 may be queued for system-level garbage collection.

In some arrangements, the system-level garbage collection service selects PLBs 510 for garbage collection based on PLB queues (e.g., a queue of PLBs 510 which are 10% utilized, another queue of PLBs 510 which are 15% utilized, yet another queue of PLBs 510 which are 20% utilized, etc.). In such arrangements, a new PLB is added to the PLB queues which identifies PLBs 510 to eventually be system-level garbage collected at a next time interval (e.g., in 15 minutes). Accordingly, even if the system-level garbage collection service is not immediately triggered to perform system-level garbage collection (e.g., because the upcoming erase block refresh times were greater than the predefined time threshold), the PLBs 510 are still scheduled for system-level garbage collection based on querying of the SSDs 310.

PLB Descriptor Table Utilization

Figure 6:
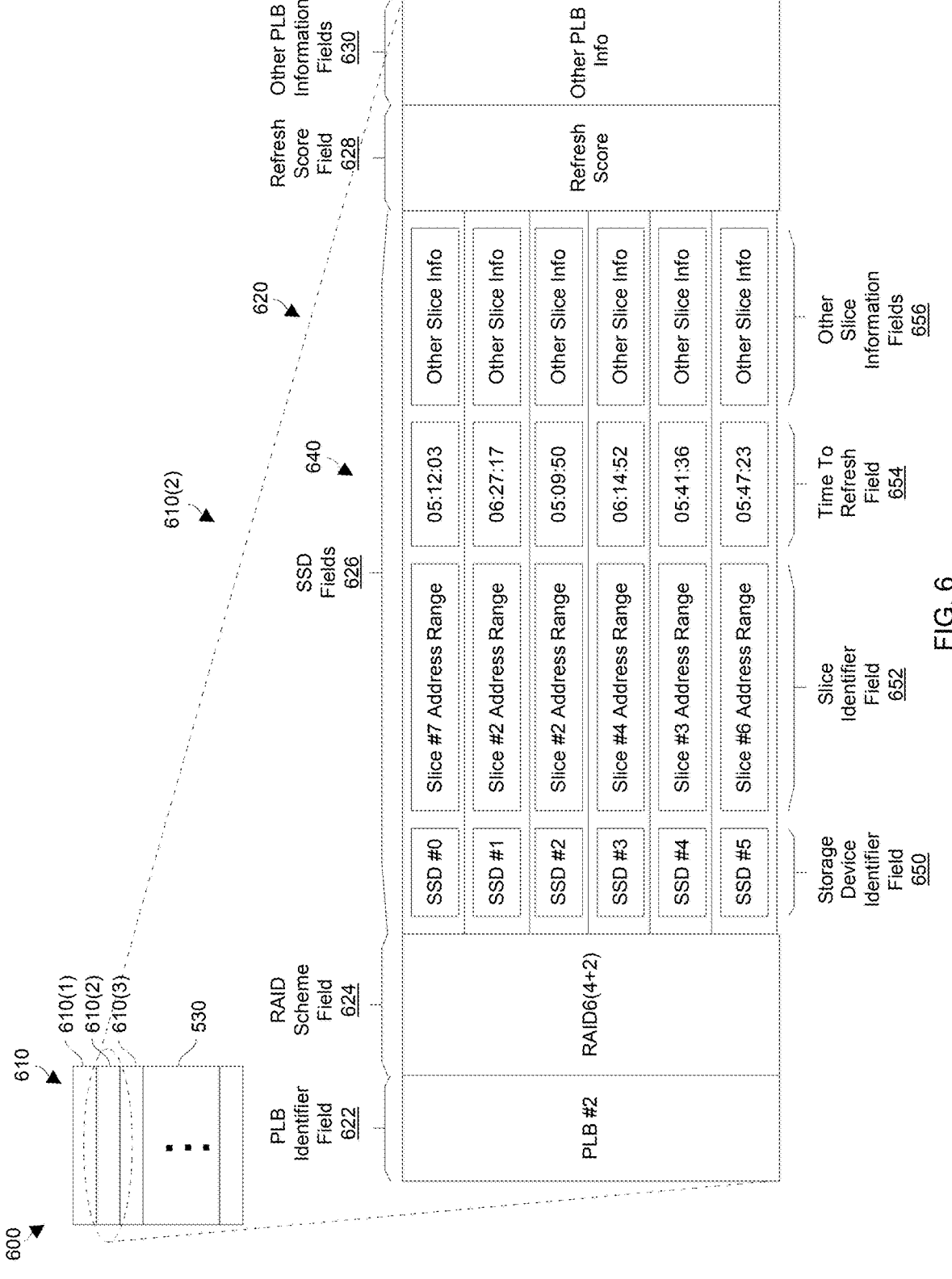
FIG. 6 is a block diagram illustrating certain PLB descriptor table details in accordance with certain embodiments.

FIG. 6 shows a view 600 of a PLB descriptor table 530 which is utilized during the above-described process 500 when improving SSD storage endurance. The PLB descriptor table 530 includes PLB descriptor table entries 610(1), 610(2), 610(3), . . . (collectively, PLB descriptor table entries 610).

In some arrangements, the PLB descriptor table 530 is a standard PLB descriptor table that has been enhanced (or extended) to include refresh times for the SSDs 310. Along these lines, the PLB descriptor table 530 may maintain, per each SSD 310, a target refresh time (TRT) for PLB data that is stored on that SSD 310 (where TRT indicates the time in which that data is expected to be refreshed by the SSD 310).

For example, the PLB descriptor table entries (or simply entries) 610 may maintain information for respective PLBs 510. Along these lines, the entry 610(1) may hold PLB information for a PLB 510(1), the entry 610(2) may hold PLB information for a PLB 510(2), and so on (also see FIG. 5).

As further shown in FIG. 6, the entries 610 include fields 620. Among the fields 620 are a PLB identifier field 622, a RAID scheme field 624, SSD fields 626, a refresh score field 628, and other PLB information fields 630. It should be appreciated that the PLB descriptor table 530 may be used for activities, services, features, etc. beyond system-level garbage collection and therefore maintain additional information that is beyond the scope of this disclosure. Moreover, the actual form of the PLB descriptor table 530 may vary (e.g., an array in contiguous memory, linked lists, pages in a cache, combinations thereof, etc.).

The PLB identifier fields 622 are constructed and arranged to hold PLB identifiers that uniquely identify the PLBs 510 among each other (FIG. 5). Such PLB identifiers enable the storage processing circuitry 142 to individually manage/identify/etc. each PLB 510.

The RAID scheme fields 624 are constructed and arranged to indicate which RAID protection schemes the PLBs 510 employ. Suitable examples include RAID0, RAID1, RAID5 (e.g., RAID5 (2+1), RAID5 (4+1), RAID5 (8+1), etc.), RAID6 (e.g., RAID6 (4+2), RAID6 (8+2), etc.), RAID10, and so on. It should be understood that, based on the particular RAID protection schemes that are used, the PLBs 510 may include a different number of storage devices 144 (e.g., nine SSDs for RAID5 (8+1), six SSDs for RAID6 (4+2), and so on).

The SSD fields 626 are constructed and arranged to maintain information 640 for the various SSDs 310 that are used to form the PLBs 510. Along these lines, the SSD fields 626 may include a subset of fields (or a set of subfields) for the individual PLB slices forming the PLBs 510. Accordingly, the numbers of SSDs 310 monitored by the entries 610 of the PLB descriptor table 530 may vary depending on the number of PLB slices in the RAID protection schemes employed by the respective PLBs 510. Further details of the SSD fields 626 will be provided shortly.

The refresh score fields 628 are constructed and arranged to maintain refresh scores for the PLBs 510. Such refresh scores maybe derived from the upcoming refresh times and then evaluated to determine when to perform system-level garbage collection on the PLBs 510. Further details regarding the refresh scores will be provided shortly.

The other PLB information fields 630 include other PLB information. For example, the other PLB information may indicate whether the PLBs 510 are degraded, how much of the PLBs 510 are currently utilized, whether the PLBs 510 use hard disk drives (HDDs) rather than SSDs, status (e.g., whether the PLB is being used or is free/available), states (e.g., locked/unlocked, undergoing recovery, etc.), ownership, and so on.

As mentioned above, the SSD fields 626 of the PLB entries 610 may include subsets of fields for the individual PLB slices forming the PLBs 510. For respective PLB slices, such subsets of fields include storage device identifier fields 650, slice identifier fields 652, time-to-refresh fields 654, and other slice information fields 656.

The storage device identifier fields 650 are constructed and arranged to maintain identifiers which uniquely identify the storage devices 142 (e.g., see the SSDs 310 in FIG. 5). The slice identifier fields 652 are constructed and arranged to maintain slice identifiers which uniquely identify slices within the identified storage devices 142. The time-to-refresh fields 654 maintain times in which the storage devices 142 will perform refreshes on the identified slices. The other slice information fields 656 identify other slice information (e.g., whether the slice holds regular data or parity, whether the slice is formed from SSD or HDD memory, a determined periodic refresh interval for the slice if the slice is formed of SSD memory from a properly provisioned/configured SSD, and so on).

By way of example, the entry 610(2) is a PLB descriptor for the PLB 510(2) in FIG. 5. The PLB identifier field 622 of the entry 610(2) holds PLB #2 as a PLB identifier to uniquely identify the PLB 510(2). The RAID scheme field 624 of the entry 610(2) identifies the particular RAID protection scheme employed by the PLB 510(2) which is RAID6 (4+2). The SSD fields 626 of the entry 610(2) include six subsets of fields for the individual PLB slices forming the PLB 510(2).

Along these lines, each subset of fields holds information for a particular slice. For example, a first subset of fields includes a storage device identifier field 650 holding SSD #0 to identify the SSD 310(0) (FIG. 5), a slice identifier field 652 holding an address range that identifies slice #7 on SSD #0, a time-to-refresh field 654 holding 05:12:03 to indicate that the SSD #0 is scheduled to refresh slice #7 at 05:12:03, and other slice information fields 656 with other slice information (see above). The other subsets of fields hold similar information for other slices on other SSDs 310 (FIG. 5).

By way of example only, the time format is Hour: Minute: Second. However, other time formats are suitable for use as well.

Additionally, the refresh score field 628 of the entry 610(2) holds a refresh score for the PLB 510(2). The refresh score of the entry 610(2) is derived from the time-to-refresh information stored in the entry 610(2) (recall that such time-to-refresh information may be obtained by querying the SSDs 510) (also see FIG. 5). Further refresh score details will be provided shortly.

Furthermore the other PLB information fields 630 hold other information for the PLB 510(2). For example, the other information may indicate that the PLB 510(2) is currently 80% utilized by a particular application or process, the 510(2) is currently being system-level garbage collected, and so on.

Time-to-Refresh and Refresh Scores

In the PLB descriptor table entries 610 (also see FIG. 6), the time-to-refresh fields 654 for the slices (SSD storage locations that form the corresponding PLBs 510) may initially be set to INVALID. That is, the PLB descriptor table entries 610 does not have any refresh time information for the slices forming the corresponding PLBs 510.

Later, as the storage processing circuitry 142 sends query commands 520 to the SSDs 310 and receives replies 522 indicating which locations (e.g., PLB slices) are about to be refreshed (arrows #1 and #2 in FIG. 5), the storage processing circuitry 142 identifies entries 610 for modification by translating the locations which are about to be refreshed to PLBs 510, and updating the entries 610 corresponding to those PLBs 510 with upcoming refresh times.

In some arrangements, the replies 522 include lists of addresses and time at which the addresses will be refreshed. Accordingly, the storage processing circuitry 142 may compute the times-to-refresh from these times.

In some arrangements, the times in the replies 522 are amounts of time before the addresses are refreshed (e.g., time deltas before the SSDs 310 that sent the replies 522 will internally refresh the addressed locations). In such arrangements, the storage processing circuitry 142 may derive the time-to-refresh for a particular address (or slice that is covered by that address) by adding the amount of time (or time delta) before that particular address is refreshed to the current time (e.g., current time). Accordingly, the time-to-refresh for a particular address may be an absolute time in the future and calculated as follows:

$$time\!-\!to\!-\!refresh = current\_time + time\_delta\_before\_refresh. \quad (1)$$

For example, suppose that the current time is 05:02:03. Further suppose that, in response to a query command 520, the storage processing circuitry 142 receives a reply 522 from SSD #0 indicating that slice #7 of SSD #0 is to be refreshed in 10 minutes (i.e., the time delta). In this situation, the storage processing circuitry 142 may translate the coordinates of slice #7 of SSD #0 to the entry 610(2) for the PLB #2, and update the time-to-refresh field 654 for slice #7 of SSD #0 accordingly. In particular, using equation (1), the storage processing circuitry 142 adds 10 minutes to the current time and generates 05:12:03 as the result, and stores 05:12:03 in the appropriate time-to-refresh field 654 of the entry 610(2). The storage processing circuitry 142 may continue this operation for other SSDs 310 so that the entries 610 of the PLB descriptor table 530 are continuously updated over time.

When the storage processing circuitry 142 updates the time-to-refresh information in the entries 610, the storage processing circuitry 142 may further compute refresh scores to determine whether the respective PLBs 510 should be considered for system-level garbage collection (e.g., by comparing the refresh scores to a predefined threshold). Such refresh scores may be considered metrics which reflect periodic refresh risk (PRR). Along the lines, the storage processing circuitry 142 may enter the refresh scores in the refresh score fields 628 of the entries 610 as well as evaluate the refresh scores (e.g., to trigger system-level garbage collection if the data storage equipment 104 is idle or barely utilized, to possibly enter PLBs into a queue for system-level garbage collection if the data storage equipment 104 is in a normal utilization state, etc.).

In some arrangements, the storage processing circuitry 142 calculates refresh scores for the PLBs 510 by selecting the minimum times to refresh among the times-to-refresh in the entries 610 for the PLBs 510. For example, after the storage processing circuitry 142 has updated a time-to-refresh field 654 in the entry 610(2) for PLB #2 (see FIG. 6), the storage processing circuitry 142 updates the refresh score in the refresh score field 628 to be the minimum time (or soonest time) among the slices that form PLB #2. Accordingly, the storage processing circuitry 142 sets the refresh score to be 05:09:50 since this time is the earliest (or worst case) time at which at least part of PLB #2 will be refreshed.

In other arrangements, the storage processing circuitry 142 calculates refresh scores for the PLBs 510 by computing the average time to refresh among the times-to-refresh in the entries 610 for the PLBs 510. Other arrangements are suitable for use as well such as by discounting or lowering the computed refresh scores by a margin (e.g., 2 minutes, 3 minutes, etc.) to account for other processing, delays, and/or latency before system-level garbage collection takes place.

Once the storage processing circuitry 142 computes a refresh score, the storage processing circuitry 142 compares the refresh score to a predefined time threshold. Such a predefined time threshold may be an absolute time or a delta time.

For example, in the context of an absolute time, suppose that the predefined time threshold is 10 minutes in the future. In this situation, if the current time is 05:03:42, the predefined time threshold may be 05:13:42. Accordingly, if the refresh score is sooner than the predefined time threshold (e.g., 05:13:42), the storage processing circuitry 142 identifies (e.g., queues) PLB #2 for system-level garbage collection. However, if the refresh score is not sooner than the predefined time threshold, the storage processing circuitry 142 does not identify PLB #2 for system-level garbage collection.

Alternatively, in the context of a delta time, again suppose that the predefined time threshold is 10 minutes in the future. In this situation, the storage processing circuitry 142 subtracts the refresh score from the current time to compute the delta time. If the delta time is less than the predefined time threshold, the storage processing circuitry 142 identifies (e.g., queues) PLB #2 for system-level garbage collection. However, if the refresh score is not less than the predefined time threshold, the storage processing circuitry 142 does not identify PLB #2 for system-level garbage collection.

In accordance with certain embodiments, the storage processing circuitry 142 determines how to handle system-level garbage collection based on current loading. For example, if system-level garbage collection is not currently running, the storage processing circuitry 142 may impose, as the predefined time threshold, a first threshold. If the refresh score is below this first threshold, the storage processing circuitry 142 explicitly triggers system-level garbage collection into operation to garbage collect PLBs that are close to refresh. Along these lines, any PLBs 510 have refresh scores below the first threshold will be system-level garbage collected.

However, suppose that the storage processing circuitry 142 is in a state of normal loading. Here, the storage processing circuitry 142 may simply add PLBs 510 to a special queue if the refresh scores for those PLBs 510 is lower than a second threshold. In some arrangements, the second threshold is lower than the first threshold.

In some arrangements, the storage processing circuitry 142 identifies PLBs 510 for system-level garbage collection by placing entries for the PLBs 510 in a dedicated SSD endurance improvement queue. Such a queue may reside among other PLB queues that the system-level garbage collection service accesses when performing system-level garbage collection (e.g., percent utilization queues, etc.).

In some arrangements, the storage processing circuitry 142 provides different services for the process 500 (FIG. 5). Along these lines, the storage processing circuitry 142 may run a querying/update/evaluation service (also see arrows #1, #2, and #3 in FIG. 5). Additionally, in parallel, the storage processing circuitry 142 may run a system-level garbage collection service (also see arrows #4, #5, and #6 in FIG. 5).

It should be appreciated that the system-level garbage collection service may algorithmically decide on the amount of emphasis to place on garbage collecting PLBs 510 that are about to be refreshed and poorly utilized PLBs 510 (e.g., PLBs 510 that only contain X % valid data where X is 40%, 30%, 25%, etc.). Accordingly, the system-level garbage collection service is able to strike a balance between system-level garbage collecting (i) PLBs 510 that are close to being internally refreshed but perhaps are not the emptiest and (ii) PLBs 510 that are the emptiest in order to achieve predefined garbage collection efficiency targets.

Further Details

FIG. 7 is a flowchart of a procedure 700 which provides endurance to SSD storage in accordance with certain embodiments. Such a procedure 700 may be performed by specialized circuitry (e.g., a set of processors running specialized code, also see FIG. 2) to alleviate (or reduce) internal refreshes by the SSD storage thus saving program/erase cycles.

At 702, the specialized circuitry queries the SSD storage for locations which are about to be refreshed by the SSD storage. Along these lines, certain SSDs may have extended SSD interfaces which allow the specialized circuitry to query the SSDs for LBAs that are about to be refreshed in the next "time duration" interval (e.g., provided with the query command).

At 704, the specialized circuitry identifies storage objects that include the locations which are about to be refreshed in response to querying the SSD storage. Along these lines, the SSDs return lists of addresses which the SSD storage has scheduled for internal refreshing within the specified time period. Here, the storage objects may be PLBs formed from PLB slices (or segments) of the SSDs (also see FIG. 5).

At 706, the specialized circuitry garbage collects at least some of the identified storage objects prior to the locations which are about to be refreshed being refreshed by the SSD storage. Along these lines, the specialized circuitry performs system-level garbage collection and informs the SSD storage to unmap the garbage collected locations. Such operation alleviates the need for the SSD storage to perform internal refresh of those location thus increasing endurance of the SSD storage.

As described above, improved techniques are directed to querying SSD storage for locations which are about to be refreshed and then system-level garbage collecting data from these locations just before the SSD storage refreshes these locations. Such system-level garbage collecting of data from these locations alleviates the need to refresh these locations thus improving SSD storage endurance. Furthermore, such system-level garbage collection improves storage efficiency and makes the locations available for future use. Even if the locations are not fully emptied such that periodic refresh is not entirely avoided, such system-level garbage collection from locations which are about to be refreshed results in less valid data to refresh thus reducing WA.

One should appreciate that the above-described techniques do not merely collect and store data. Rather, the disclosed techniques involve improvements to the technology of data storage. With such techniques, advantages are available such as increasing SSD life, improving storage efficiency, reducing WA, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 100 such as the host computers 102 are capable of being implemented in or "moved to" the cloud, e.g., to remote computer resources distributed over a network. Here, the various computer resources may be distributed tightly (e.g., a server farm in a single facility), over relatively large distances (e.g., over a campus, in different cities, coast to coast, etc.), combinations thereof, etc. In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

In accordance with certain embodiments, various techniques are related to storage system awareness of SSD periodic refresh. Such techniques provide for improvements to SSD endurance.

It should be appreciated that an SSD supports a limited number of P/E (Program/Erase) cycles for each erase block. The limited number of NAND block writes is one of the factors that defines the SSD endurance, which can be described by a drive writes per day (DWPD) value. This value indicates the supported number of full disk writes per day, over the warranty period. The SSD endurance, expressed by the DWPD value, is directly proportional to the PE count.

A significant difference in QLC drives is that QLC drives have a much lower P/E count than TLC drives, and therefore their DWPD is significantly lower than TLC drives (e.g., 0.2 vs 1).

Another significant difference in QLC drives is that a substantial portion of the total P/E count of QLC drives (not included in the DWPD formula above) is reserved for periodic refreshes, which is part of SSD retention management. The SSD periodically remaps data within erase blocks, in order to avoid uncorrectable retention errors.

The SSD may rewrite data that was written to an erase block after PR_PERIOD_DURATION time (e.g., 4 days) has passed since it was written, if the host didn't overwrite/unmap all the corresponding LBAs during that time. The Refresh period is determined by the QLC device and is fixed.

As QLC drives become more cost-effective with higher capacities, the motivation for finding ways to improve their endurance is increased.

Traditional methods to improve the effective SSD endurance usually attempt to reduce the WA by doing better host garbage collection (GC), for example by hot/cold data separation. However, in accordance with various improvements disclosed herein, effective SSD endurance is improved by reducing the number of P/E cycles that are used for periodic refreshes, thus making them available for normal/regular writes.

In accordance with certain embodiments, techniques reduce the number P/E cycles associated with the SSD periodic refreshes, by updating the storage system GC to be aware of the SSD periodic refresh and therefore improve effective SSD endurance.

Consider a storage system composed of storage nodes which generally consists of a CPU, memory and a DAE (Disk Array Enclosure) with SSD drives as the backend. The storage system may use a RAID5 or RAID6 parity protection scheme to store the user data. The RAID is organized in grids of fixed size blocks, with R rows and K+1 (RAID5) or K+2 (RAID6) columns called UBERs. Each column is a separate physical drive, and one (RAID5) or two (RAID6) columns are designated as parity. For RAID6 for example, each UBER is constructed with a subset of K+2 drives (out of total N drives in the DAE); different UBERs may have different K+2 drives.

Each line in the UBER may be referred to as a PLB (Physical Large Block) which may contain 2 MB of compressed data. For example, with reference to FIG. 3, 2 MB of SSD storage may be split between four drives 0 . . . 3, each stores 512 KB, and each parity drive stores 512 KB of parity, which means each line stores a total of 3 MB.

An overall UBER may contain a fixed capacity (e.g., 64 GB) of user data (excluding parity), and is constructed with fixed size slices of (e.g., 4 GB). Referring to the above example, an UBER with 4+2 (K=4) drives will have 4 slices on each drive (4 slices of 4 GB×4 data drives=4×4×4-64 GB of user data), while the total UBER capacity is 96 GB (including the 2 parity drives).

Such a storage system may use log-structured writes for the user data, e.g., always writing full PLBs. When a data block within an existing PLB is overwritten, the new (compressed) data will be written (together with more new data) to a NEW (EMPTY) PLB (the existing PLB which held the old data is never modified—the updated block is only marked as invalidated).

The system may use a garbage collection (GC) process which merges partially utilized PLBs (i.e., source PLBs) and writes them to a new PLBs (i.e., destination PLBs), freeing the old partially used PLBs. As a result, the free PLBs are randomly spread in the drives, and therefore the storage system randomly writes to the SSDs.

The random-write performance of SSDs is much lower than sequential writes. The reason is that the SSD writes data in "erase block" units, which must be completely erased before they can be rewritten. Overwrites of data within an erase block always go to new erase block. When the overwrites leave holes, the drive has much more load to free full erase blocks that can be erased and reused, as it needs to move data from one block to others (i.e., internal SSD garbage collection), which means performing more reads and writes.

The excessive SSD GC causes not only to performance degradation, but also causes accelerated wear of the SSD. The SSD supports a limited number of P/E (Program/Erase) cycles for each erase block; therefore, the more GC is performed, the SSD needs to rewrite (P/E) more erase blocks.

At this point, it should be appreciated that the limited number of a NAND block writes is one of the factors that defines the SSD endurance, which can be described by the Drive Writes Per Day (DWPD) value. This value indicates the supported number of full disk writes per day, over the warranty period. For example, a drive may have a 1 DWPD over 5 years.

The DWPD value may be calculated using the following formula:

$$DWPD = PE \times \left| \frac{1+IP}{EOL \times WA} \right|. \tag{2}$$

Here, the following terms are defined:
PE: number of program/erase cycles of the NAND,
OP: the over provisioning,
EOL: total number of days for drive EOL (end of life), (typically 5 yrs×365.25), and
WA: Write Amplification for the OP.

As depicted in the above formula, the SSD endurance, expressed by the DWPD value, is directly proportional to the PE count.

A significant difference in QLC drives is that QLC drives have a much lower P/E count than TLC drives, and therefore their DWPD is significantly lower than TLC drives (e.g., 0.2 vs 1). QLC SSDs have less endurance than TLC SSDs for two main reasons:

1) More charge levels: QLC (Quad-Level Cell) flash memory stores 4 bits of data per cell, while TLC (Triple-Level Cell) stores 3 bits. Each additional charge level increases the complexity of storing and reading data accurately, making QLC cells more susceptible to wear and tear.

2) Smaller voltage gaps: The different voltage levels representing data in QLC cells are closer together than in TLC cells. This makes it more difficult to accurately distinguish between voltage levels, especially as the cell ages and accumulates electrical noise. This leads to a higher chance of errors and reduced endurance.

Another significant difference in QLC drives is that a substantial portion of the total P/E count of QLC drives (not included in the DWPD formula above) is reserved for periodic refreshes, which is part of the SSD retention management. The SSD periodically remaps data within erase blocks, in order to avoid uncorrectable retention errors.

The SSD may rewrite data that was written to an erase block after PR_PERIOD_DURATION time (e.g., 4 days) has passed since it was written, if the host didn't overwrite/unmapped all the corresponding LBAs during that time. The refresh period is determined by the QLC device and is fixed.

For example, consider SSD drive with P/E=2000, and DWPD=0.2, where additional 1000 P/E cycles (not included in the 2000), are accounted for periodic refreshes.

It should be further appreciated that, as QLC drives become more cost-effective with higher capacities, the motivation for finding ways to improve their endurance is increased.

Traditional methods to improve the effective SSD endurance usually attempts to reduce the WA by doing a better host GC, for example by hot/cold data separation.

In accordance with certain embodiments, techniques are directed to improving the effective SSD endurance by reducing the number of P/E cycles that are used for periodic refreshes, thus making them available for normal/regular writes.

Continuing the previous example, if the periodic refreshes could have been completely avoided (best case), those 1000 P/E cycles could be used for normal writes and improve the DWPD to 0.3.

In accordance with certain embodiments, a method reduces the number P/E cycles associated with the SSD periodic refreshes, by updating the storage system GC to be aware of the SSD periodic refresh and therefore improve the effective SSD endurance.

In accordance with certain embodiments, SSDs have their interfaces extended in order to allow the storage system to query the SSD for LBAs that are about to be refreshed in the next "time duration" interval (provided with the query command). The storage system then uses this information as an additional metric for its GC component to prefer garbage collection of PLBs that are closer to be refreshed, thus reducing the Periodic Refresh impact on the SSD endurance.

Following paragraphs describe a method in accordance with certain embodiments:

1) SSDs are extended to support a "PRQ" (Periodic Refresh Query) command for a list of LBAs that are about to be refreshed. The command will provide an interval as a parameter e.g., 30 minutes. The SSD will reply with a list of LBAs that are expected to be "refreshed" within the given time interval, together with the actual expected time to refresh (TTR) period. As the SSD refreshes in (at least) erase block granularity, it may provide one TTR for each sub-list of LBAs, in order to reduce the reply bandwidth.

2) The storage system periodically queries, e.g., every 10 minutes, each SSD for the list of LBAs that are about to be refreshed. As an optimization, the SSD may avoid reporting the same LBAs again.

3) The storage system extends the PLB descriptor to maintain per each drive the target refresh time (TRT) for the PLB data that is stored on that drive. The TRT indicates the time in which that data is expected to be refreshed by the drive.

4) The TRT is updated as follows:
   a. The TRT is set to INVALID on initialization.
   b. When the storage system receives a list of LBAs to be refreshed from the PRQ command, it will "translate" each LBA to a PLB and update the PLB descriptor for the corresponding drive with the TRT. The TRT is calculated by: CURR_TIME+TTR.
   c. After the PLB is GC'ed, all TRT values are set to INVALID.

5) The storage system GC component periodically scans UBERs and adds PLBs that passes several conditions (e.g., if the PLB is considered "hot" or "cold") to a "candidate queues", in accordance with their utilization. The GC component is modified (or enhanced) to prefer PLBs that are about to be refreshed:
   a. When a PLB is checked to be added to the candidate queues, its Periodic Refresh Risk (PRR) is calculated. If the PRR is less than a predefined threshold, the PLB is added to the candidate queues, regardless of the other conditions.
   b. The PRR function is, for example, the calculation of the minimum time to refresh among the PLB drives. Alternatively, the PRR is the calculation of the average time to refresh among the PLB drives. Other functions may be implemented.
   c. When the GC picks the source PLBs to clean, from the candidate queues, it prefers the PLBs with the lowest PRR.

6) In order to prevent the drives from refreshing, the GC component notifies the drives of the data that was moved and is now invalid, by "unmapping" the corresponding LBAs after PLBs were cleaned. If all LBAs of an erase block were moved before the periodic refresh deadline, the periodic refresh could be entirely avoided. If there are still valid LBAs, the periodic refresh may still happen, however the write amplification will be reduced, as there will be less valid data to refresh.

7) Generally, GC picks the emptiest PLBs for efficiency reasons i.e., to move as little data as possible. Preferring to GC PLBs that are close to refresh but are not the emptiest (e.g., full PLBs) may impact the GC efficiency and the system performance. Therefore, the following method may be performed according to the system state:
   a. Idle state: when GC is not running (i.e., non-aggressive policy), a PRR_IDLE_THRESHOLD will be used, to add PLBs with PRR below PRR_IDLE_TH-RESHOLD to the candidate queues. During this state, the GC is explicitly triggered, to handle PLBs that are close to refresh, since otherwise a P/E cycle will be wasted. The GC will be periodically triggered, and if there are PLBs with PRR below the PRR_IDLE_THRESHOLD, they are GC'ed.
   b. Normal state: PLBs with PRR below a PRR_NOR-MAL_THRESHOLD is added to the candidate queues. Naturally, the PRR_IDLE_THRESHOLD value is higher than the PRR_NORMAL_THRESH-OLD value.

Such techniques are able to significantly reduce the P/E cycles used for the SSD periodic refresh, by adding a simple command to the SSD interface and a minimal computation by the storage system, which will improve the effective SSD endurance.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

Along these lines, it should be appreciated that the improvements disclosed herein may be applied to SSD technologies other than QLC. Other example SSD technologies include MLC, TLC, SLC, etc.

Additionally, it should be understood that the improvements disclosed herein may be applied to mapped RAID architectures. In a mapped RAID architecture, PLBs may be formed from a number of segments (or slices) where the number of storage devices available in the RAID is larger than the number of segments. Such modifications and enhancements are intended to belong to various embodiments of the disclosure.

What is claimed is:

1. A method of providing endurance to solid state device (SSD) storage, the method comprising:

querying the SSD storage for locations which are about to be refreshed by the SSD storage;

identifying storage objects that include the locations which are about to be refreshed in response to querying the SSD storage; and prior to the locations which are about to be refreshed being refreshed by the SSD storage, garbage collecting at least some of the identified storage objects to increase endurance of the SSD storage;

wherein querying the SSD storage includes:

sending a query command to a SSD which forms at least some of the SSD storage, and receiving a set of addresses from the SSD in response to sending the query command.

2. The method of claim 1 wherein sending the query command to the SSD includes:

providing, as part of the query command, a time parameter identifying an amount of time.

3. The method of claim 2 wherein receiving the set of addresses from the SSD includes:

acquiring, as the set of addresses from the SSD, a set of logical block addresses (LBAs) which the SSD maps to a set of physical blocks that are scheduled to be refreshed via SSD internal garbage collection within the amount of time identified by the time parameter.

4. The method of claim 1 wherein the SSD storage includes SSDs;

wherein the storage objects are physical large blocks (PLBs) formed by segments of the SSDs;

wherein a table descriptor table includes PLB descriptors corresponding to the PLBs formed by the segments of the SSDs; and wherein identifying the storage objects includes:

translating the locations which are about to be refreshed to PLBs which include the locations which are about to be refreshed, and updating particular PLB descriptors of the PLB descriptor table with upcoming refresh times in response to querying the SSD storage, the particular PLB descriptors corresponding to the PLBs which include the locations which are about to be refreshed.

5. The method of claim 4 wherein identifying the storage objects further includes:

after the particular PLB descriptors of the PLB descriptor table are updated, computing refresh scores for the PLB descriptors of the PLB descriptor table based on the upcoming refresh times.

6. The method of claim 5 wherein identifying the storage objects further includes:

after the refresh scores for the PLB descriptors of the PLB descriptor table are computed, queuing a set of PLBs for garbage collection based on the refresh scores for the PLB descriptors.

7. The method of claim 1 wherein the SSD storage includes SSDs;

wherein the storage objects are physical large blocks (PLBs) formed by segments of the SSDs;

wherein garbage collecting at least some of the identified storage objects includes:

performing system-level garbage collection on PLBs which include the locations which are about to be refreshed.

8. The method of claim 7 wherein the SSDs include mapped segments which are scheduled to be refreshed and unmapped segments where are not scheduled to be refreshed; and wherein performing system-level garbage collection on the PLBs includes:

reading data from at least some of the mapped segments which are scheduled to be refreshed, and writing the data to at least some of the unmapped segments which are not scheduled to be refreshed.

9. The method of claim 8 wherein reading the data from at least some of the mapped segments which are scheduled to be refreshed includes:

reading the data from a first number of SSD locations; and wherein writing the data to at least some of the unmapped segments which are not scheduled to be refreshed includes:

writing the data to a second number of SSD locations, the second number being less than the first number.

10. The method of claim 7 wherein the SSDs include mapped segments which are scheduled to be refreshed; and wherein performing system-level garbage collection on the PLBs includes:

reading data from at least some of the mapped segments which are scheduled to be refreshed, the at least some of the mapped segments being scheduled to be refreshed at an upcoming refresh time, and the data being read from the at least some of the mapped segments prior to the upcoming refresh time.

11. The method of claim 10, further comprising:

prior to the upcoming refresh time, sending unmap commands to the SSDs to prevent the at least some of the mapped segments from being refreshed at the upcoming refresh time.

12. The method of claim 1 wherein garbage collecting at least some of the identified storage objects includes:

based on refresh time information obtained in response to querying the SSD storage, generating refresh scores that correspond to the identified storage objects.

13. The method of claim 12 wherein a system-level garbage collection service is constructed and arranged to perform system-level garbage collection on storage objects based on storage object identifiers residing in a set of queues;

wherein the system-level garbage collection service is currently in an active state; and wherein garbage collecting at least some of the identified storage objects further includes:

in response to particular refresh scores corresponding to particular storage objects being lower than a predefined refresh score threshold, placing storage object identifiers corresponding to the particular storage objects in the set of queues to direct the system-level garbage collection service to garbage collect the particular storage objects based on the storage object identifiers placed in the set of queues.

14. The method of claim 12 wherein a system-level garbage collection service is constructed and arranged to perform system-level garbage collection on storage objects based on storage object identifiers residing in a set of queues;

wherein the system-level garbage collection service is currently in an idle state; and wherein garbage collecting at least some of the identified storage objects further includes:

in response to particular refresh scores corresponding to particular storage objects being lower than a predefined refresh score threshold, placing storage object identifiers corresponding to the particular storage objects in the set of queues and transitioning the system-level garbage collection service from the idle state to an active state to direct the system-level garbage collection service to garbage collect the particular storage objects based on the storage object identifiers placed in the set of queues.

15. Data storage equipment, comprising:
memory; and
control circuitry coupled to the memory, the memory storing instructions which, when carried out by the control circuitry, cause the control circuitry to perform a method of:
  querying solid state device (SSD) storage for locations which are about to be refreshed by the SSD storage;
  identifying storage objects that include the locations which are about to be refreshed in response to querying the SSD storage; and
  prior to the locations which are about to be refreshed being refreshed by the SSD storage, garbage collecting at least some of the identified storage objects to increase endurance of the SSD storage;
  wherein querying the SSD storage includes:
    sending a query command to a SSD which forms at least some of the SSD storage, and
    receiving a set of addresses from the SSD in response to sending the query command.

16. The data storage equipment of claim 15 wherein the SSD storage includes SSDs;
  wherein the storage objects are physical large blocks (PLBs) formed by segments of the SSDs;
  wherein a table descriptor table includes PLB descriptors corresponding to the PLBs formed by the segments of the SSDs; and
  wherein identifying the storage objects includes:
    translating the locations which are about to be refreshed to PLBs which include the locations which are about to be refreshed, and
    updating particular PLB descriptors of the PLB descriptor table with upcoming refresh times in response to querying the SSD storage, the particular PLB descriptors corresponding to the PLBs which include the locations which are about to be refreshed.

17. The data storage equipment of claim 15 wherein garbage collecting at least some of the identified storage objects includes:
  based on refresh time information obtained in response to querying the SSD storage, generating refresh scores that correspond to the identified storage objects.

18. A computer program product having a non-transitory computer readable medium which stores a set of instructions to provide endurance to solid state device (SSD) storage; the set of instructions, when carried out by computerized circuitry, causing the computerized circuitry to perform a method of:
  querying the SSD storage for locations which are about to be refreshed by the SSD storage;
  identifying storage objects that include the locations which are about to be refreshed in response to querying the SSD storage; and
  prior to the locations which are about to be refreshed being refreshed by the SSD storage, garbage collecting at least some of the identified storage objects to increase endurance of the SSD storage;
  wherein garbage collecting at least some of the identified storage objects includes:
    based on refresh time information obtained in response to querying the SSD storage, generating refresh scores that correspond to the identified storage objects.

19. The computer program product of claim 18 wherein querying the SSD storage includes:
  sending a query command to a SSD which forms at least some of the SSD storage, and
  receiving a set of addresses from the SSD in response to sending the query command.

20. The computer program product of claim 18 wherein the SSD storage includes SSDs;
  wherein the storage objects are physical large blocks (PLBs) formed by segments of the SSDs;
  wherein a table descriptor table includes PLB descriptors corresponding to the PLBs formed by the segments of the SSDs; and
  wherein identifying the storage objects includes:
    translating the locations which are about to be refreshed to PLBs which include the locations which are about to be refreshed, and
    updating particular PLB descriptors of the PLB descriptor table with upcoming refresh times in response to querying the SSD storage, the particular PLB descriptors corresponding to the PLBs which include the locations which are about to be refreshed.

* * * * *